(12) United States Patent
Chebiyyam et al.

(10) Patent No.: US 11,645,404 B2
(45) Date of Patent: May 9, 2023

(54) SYSTEM, METHOD, AND COMPUTER PROGRAM PRODUCT FOR PREVENTING ACCESS TO DATA WITH RESPECT TO A DATA ACCESS ATTEMPT ASSOCIATED WITH A REMOTE DATA SHARING SESSION

(71) Applicant: McAfee, LLC, Santa Clara, CA (US)

(72) Inventors: Gopi Krishna Chebiyyam, Hyderabad (IN); Prasanna Ganapathi Basavapatna, Bangalore (IN)

(73) Assignee: McAfee, LLC, San Jose, CA (US)

( * ) Notice: Subject to any disclaimer, the term of this patent is extended or adjusted under 35 U.S.C. 154(b) by 161 days.

(21) Appl. No.: 15/862,493

(22) Filed: Jan. 4, 2018

(65) Prior Publication Data
US 2018/0129818 A1 May 10, 2018

Related U.S. Application Data

(63) Continuation of application No. 14/289,859, filed on May 29, 2014, now Pat. No. 10,198,587, which is a continuation of application No. 11/850,432, filed on Sep. 5, 2007, now abandoned.

(51) Int. Cl.
*H04L 29/06* (2006.01)
*G06F 21/62* (2013.01)
*H04L 9/40* (2022.01)

(52) U.S. Cl.
CPC ...... *G06F 21/6218* (2013.01); *G06F 21/6272* (2013.01); *H04L 63/0245* (2013.01); *H04L 63/1416* (2013.01)

(58) Field of Classification Search
CPC ... H04L 9/00; H04L 63/0245; H04L 63/1416; G06F 21/00; G06F 21/6218; G06F 21/6272
See application file for complete search history.

(56) References Cited

U.S. PATENT DOCUMENTS

| | | |
|---|---|---|
| 4,797,447 A | 1/1989 | Gergen et al. |
| 5,195,086 A | 3/1993 | Baumgartner et al. |
| 5,280,527 A | 1/1994 | Gullman et al. |
| 5,485,068 A | 1/1996 | Vaught |
| 5,572,694 A | 11/1996 | Uchino |

(Continued)

FOREIGN PATENT DOCUMENTS

| | | |
|---|---|---|
| GB | 2411330 A | 8/2005 |
| WO | 2002/093410 A1 | 11/2002 |

(Continued)

OTHER PUBLICATIONS

Notice of Allowance received for U.S. Appl. No. 12/102,526, dated Sep. 21, 2012, 8 pages.

(Continued)

*Primary Examiner* — Joseph P Hirl
*Assistant Examiner* — Leynna Truvan
(74) *Attorney, Agent, or Firm* — Hanley, Flight & Zimmerman

(57) ABSTRACT

A system, method, and computer program product are provided for preventing access to data associated with a data access attempt. In use, a data access attempt associated with a remote data sharing session is identified. Further, access to the data is prevented.

19 Claims, 6 Drawing Sheets

(56) References Cited

U.S. PATENT DOCUMENTS

| | | |
|---|---|---|
| 5,796,948 A | 8/1998 | Cohen |
| 5,845,068 A | 12/1998 | Winiger |
| 5,941,915 A | 8/1999 | Federle et al. |
| 5,987,610 A | 11/1999 | Franczek et al. |
| 6,073,142 A | 6/2000 | Geiger et al. |
| 6,081,265 A | 6/2000 | Nakayama et al. |
| 6,177,932 B1 | 1/2001 | Galdes et al. |
| 6,240,417 B1 | 5/2001 | Eastwick et al. |
| 6,367,019 B1 | 4/2002 | Ansell et al. |
| 6,460,050 B1 | 10/2002 | Pace et al. |
| 6,658,566 B1 | 12/2003 | Hazard |
| 6,718,367 B1 | 4/2004 | Ayyadurai |
| 6,741,851 B1 | 5/2004 | Lee et al. |
| 6,820,204 B1 | 11/2004 | Desai et al. |
| 6,934,857 B1 | 8/2005 | Bartleson et al. |
| 6,957,330 B1 | 10/2005 | Hughes |
| 6,961,765 B2 | 11/2005 | Terry |
| 7,023,816 B2 | 4/2006 | Couillard |
| 7,100,123 B1 | 8/2006 | Todd et al. |
| 7,124,197 B2 | 10/2006 | Ocepek et al. |
| 7,149,778 B1 | 12/2006 | Patel et al. |
| 7,194,623 B1 | 3/2007 | Proudler et al. |
| 7,194,728 B1 | 3/2007 | Sirota et al. |
| 7,222,305 B2 | 5/2007 | Teplov et al. |
| 7,257,707 B2 | 8/2007 | England et al. |
| 7,278,016 B1 | 10/2007 | Detrick et al. |
| 7,313,615 B2 | 12/2007 | Fitzpatrick et al. |
| 7,346,778 B1 | 3/2008 | Guiter et al. |
| 7,350,074 B2 | 3/2008 | Gupta et al. |
| 7,350,084 B2 | 3/2008 | Abiko et al. |
| 7,383,433 B2 | 6/2008 | Yeager et al. |
| 7,424,543 B2 | 9/2008 | Rice, III |
| 7,434,543 B2 | 10/2008 | Raukola et al. |
| 7,437,752 B2 | 10/2008 | Heard et al. |
| 7,441,000 B2 | 10/2008 | Boehringer et al. |
| 7,461,249 B1 | 12/2008 | Pearson et al. |
| 7,475,420 B1 | 1/2009 | Hernacki |
| 7,484,247 B2 | 1/2009 | Rozman et al. |
| 7,490,355 B2 | 2/2009 | Wong |
| 7,497,447 B2 | 3/2009 | Musselman |
| 7,506,155 B1 | 3/2009 | Stewart et al. |
| 7,519,984 B2 | 4/2009 | Bhogal et al. |
| 7,523,484 B2 | 4/2009 | Lum et al. |
| 7,526,654 B2 | 4/2009 | Charbonneau |
| 7,539,857 B2 | 5/2009 | Bartlett et al. |
| 7,559,080 B2 | 7/2009 | Bhargavan et al. |
| 7,581,004 B2 | 8/2009 | Jakobson |
| 7,630,986 B1 | 12/2009 | Herz et al. |
| 7,653,811 B2 | 1/2010 | Yagiura |
| 7,660,845 B2 | 2/2010 | Fusari |
| 7,661,124 B2 | 2/2010 | Ramanathan et al. |
| 7,689,563 B1 | 3/2010 | Jacobson |
| 7,730,040 B2 | 6/2010 | Reasor et al. |
| 7,742,406 B1 | 6/2010 | Muppala |
| 7,783,767 B2 * | 8/2010 | Collazo ............ H04L 29/06027 709/225 |
| 7,847,694 B2 | 12/2010 | Lee et al. |
| 7,877,616 B2 | 1/2011 | Abiko et al. |
| 7,890,587 B1 | 2/2011 | Chebiyyam |
| 7,940,756 B1 | 5/2011 | Duffy et al. |
| 8,103,727 B2 | 1/2012 | Lin |
| 8,111,413 B2 | 2/2012 | Nuggehalli et al. |
| 8,151,363 B2 | 4/2012 | Smithson |
| 8,181,036 B1 | 5/2012 | Nachenberg |
| 8,199,965 B1 | 6/2012 | Basavapatna et al. |
| 8,272,058 B2 | 9/2012 | Brennan |
| 8,353,053 B1 | 1/2013 | Chebiyyam |
| 8,424,077 B2 * | 4/2013 | Adams .................. G06F 21/62 380/241 |
| 8,446,607 B2 | 5/2013 | Zucker et al. |
| 8,590,002 B1 | 11/2013 | Chebiyyam et al. |
| 8,621,008 B2 | 12/2013 | Chebiyyam |
| 8,713,468 B2 | 4/2014 | Chebiyyam |
| 8,943,158 B2 | 1/2015 | Chebiyyam |
| 9,077,684 B1 | 7/2015 | Chebiyyam |
| 9,215,197 B2 | 12/2015 | Basavapatna et al. |
| 9,531,656 B2 | 12/2016 | Chebiyyam |
| 9,843,564 B2 | 12/2017 | Zucker et al. |
| 10,198,587 B2 | 2/2019 | Chebiyyam et al. |
| 10,489,606 B2 | 11/2019 | Basavapatna et al. |
| 2001/0046069 A1 | 11/2001 | Jones |
| 2002/0046275 A1 | 4/2002 | Crosbie et al. |
| 2002/0046575 A1 | 4/2002 | Hayes et al. |
| 2002/0083003 A1 | 6/2002 | Halliday et al. |
| 2002/0099944 A1 | 7/2002 | Bowlin |
| 2002/0157089 A1 | 10/2002 | Patel et al. |
| 2003/0043036 A1 | 3/2003 | Merrem et al. |
| 2003/0043039 A1 | 3/2003 | Salemi et al. |
| 2003/0046679 A1 | 3/2003 | Singleton |
| 2003/0065937 A1 | 4/2003 | Watanabe et al. |
| 2003/0097583 A1 | 5/2003 | Lacan et al. |
| 2003/0105979 A1 | 6/2003 | Itoh et al. |
| 2003/0133443 A1 | 7/2003 | Klinker et al. |
| 2003/0135744 A1 | 7/2003 | Almeida |
| 2003/0177394 A1 | 9/2003 | Dozortsev |
| 2003/0182435 A1 | 9/2003 | Redlich et al. |
| 2003/0192033 A1 | 10/2003 | Gartside et al. |
| 2003/0233421 A1 | 12/2003 | Shibata et al. |
| 2004/0003255 A1 | 1/2004 | Apvrille et al. |
| 2004/0006715 A1 | 1/2004 | Skrepetos |
| 2004/0010686 A1 | 1/2004 | Goh et al. |
| 2004/0027601 A1 | 2/2004 | Ito et al. |
| 2004/0034794 A1 | 2/2004 | Mayer et al. |
| 2004/0054928 A1 | 3/2004 | Hall |
| 2004/0064732 A1 | 4/2004 | Hall |
| 2004/0088433 A1 | 5/2004 | Kaler et al. |
| 2004/0111482 A1 | 6/2004 | Bourges-Waldegg et al. |
| 2004/0117802 A1 | 6/2004 | Green |
| 2004/0146006 A1 | 7/2004 | Jackson |
| 2004/0172557 A1 | 9/2004 | Nakae et al. |
| 2004/0199555 A1 | 10/2004 | Krachman |
| 2004/0199566 A1 | 10/2004 | Carlson et al. |
| 2004/0199596 A1 | 10/2004 | Nutkis |
| 2004/0230572 A1 | 11/2004 | Omoigui |
| 2004/0255138 A1 | 12/2004 | Nakae |
| 2005/0004359 A1 | 1/2005 | Rai et al. |
| 2005/0033810 A1 | 2/2005 | Malcolm |
| 2005/0038853 A1 | 2/2005 | Blanc et al. |
| 2005/0044359 A1 | 2/2005 | Eriksson et al. |
| 2005/0058285 A1 | 3/2005 | Stein et al. |
| 2005/0060643 A1 | 3/2005 | Glass et al. |
| 2005/0116749 A1 | 6/2005 | Pentakota et al. |
| 2005/0131990 A1 | 6/2005 | Jewell |
| 2005/0132184 A1 | 6/2005 | Palliyil et al. |
| 2005/0149364 A1 * | 7/2005 | Ombrellaro ............ A61B 5/103 705/3 |
| 2005/0154885 A1 | 7/2005 | Viscomi et al. |
| 2005/0166066 A1 | 7/2005 | Ahuja et al. |
| 2005/0172140 A1 | 8/2005 | Ide |
| 2005/0198285 A1 | 9/2005 | Petit |
| 2005/0204009 A1 | 9/2005 | Hazarika et al. |
| 2005/0216749 A1 | 9/2005 | Brent |
| 2005/0228989 A1 * | 10/2005 | Rabin .................. G06F 21/564 713/161 |
| 2005/0257266 A1 * | 11/2005 | Cook ........................ G06F 8/61 726/23 |
| 2005/0262208 A1 | 11/2005 | Haviv et al. |
| 2005/0272861 A1 | 12/2005 | Qiao et al. |
| 2005/0275861 A1 | 12/2005 | Ferlitsch |
| 2005/0289181 A1 | 12/2005 | Deninger et al. |
| 2006/0005244 A1 | 1/2006 | Garbow et al. |
| 2006/0010209 A1 | 1/2006 | Hodgson |
| 2006/0010217 A1 | 1/2006 | Sood |
| 2006/0021043 A1 | 1/2006 | Kaneko et al. |
| 2006/0026593 A1 | 2/2006 | Canning et al. |
| 2006/0031359 A1 | 2/2006 | Clegg et al. |
| 2006/0039554 A1 | 2/2006 | Fry |
| 2006/0041930 A1 | 2/2006 | Hafeman et al. |
| 2006/0050879 A1 | 3/2006 | Iizuka |
| 2006/0059548 A1 | 3/2006 | Hildre et al. |
| 2006/0070089 A1 | 3/2006 | Shoaib et al. |
| 2006/0075040 A1 | 4/2006 | Chmaytelli |
| 2006/0075502 A1 | 4/2006 | Edwards |
| 2006/0112166 A1 | 5/2006 | Pettigrew et al. |

(56) References Cited

U.S. PATENT DOCUMENTS

| | | | |
|---|---|---|---|
| 2006/0120526 | A1 | 6/2006 | Boucher et al. |
| 2006/0123413 | A1 | 6/2006 | Collet et al. |
| 2006/0123479 | A1 | 6/2006 | Kumar et al. |
| 2006/0132824 | A1 | 6/2006 | Aritomi |
| 2006/0168026 | A1 | 7/2006 | Keohane et al. |
| 2006/0190986 | A1 | 8/2006 | Mont et al. |
| 2006/0224589 | A1 | 10/2006 | Rowney et al. |
| 2006/0248252 | A1 | 11/2006 | Kharwa |
| 2006/0253578 | A1 | 11/2006 | Dixon et al. |
| 2007/0022285 | A1 | 1/2007 | Groth et al. |
| 2007/0028112 | A1 | 2/2007 | Mackelden et al. |
| 2007/0029744 | A1 | 2/2007 | Musselman |
| 2007/0064883 | A1 | 3/2007 | Rosenthal et al. |
| 2007/0074292 | A1 | 3/2007 | Mimatsu |
| 2007/0094394 | A1 | 4/2007 | Singh et al. |
| 2007/0101419 | A1 | 5/2007 | Dawson |
| 2007/0110089 | A1 | 5/2007 | Essafi et al. |
| 2007/0118904 | A1 | 5/2007 | Goodman et al. |
| 2007/0136593 | A1 | 6/2007 | Plavcan et al. |
| 2007/0143472 | A1 | 6/2007 | Clark et al. |
| 2007/0143837 | A1 | 6/2007 | Azeez et al. |
| 2007/0143851 | A1 | 6/2007 | Nicodemus et al. |
| 2007/0174909 | A1 | 7/2007 | Burchett et al. |
| 2007/0198656 | A1 | 8/2007 | Mazzaferri et al. |
| 2007/0214220 | A1 | 9/2007 | Alsop et al. |
| 2007/0220319 | A1 | 9/2007 | Desai et al. |
| 2007/0245148 | A1 | 10/2007 | Buer |
| 2007/0256142 | A1 | 11/2007 | Hartung et al. |
| 2007/0279668 | A1 | 12/2007 | Czyszczewski et al. |
| 2007/0280112 | A1 | 12/2007 | Zheng et al. |
| 2008/0034224 | A1 | 2/2008 | Ferren et al. |
| 2008/0040358 | A1 | 2/2008 | Deng |
| 2008/0056249 | A1* | 3/2008 | Ocko ............... H04L 12/66 370/389 |
| 2008/0065882 | A1 | 3/2008 | Goodman et al. |
| 2008/0065903 | A1 | 3/2008 | Goodman et al. |
| 2008/0079730 | A1 | 4/2008 | Zhang et al. |
| 2008/0083037 | A1 | 4/2008 | Kruse et al. |
| 2008/0120689 | A1 | 5/2008 | Morris et al. |
| 2008/0170785 | A1 | 7/2008 | Simmons et al. |
| 2008/0208988 | A1 | 8/2008 | Khouri et al. |
| 2008/0229428 | A1 | 9/2008 | Camiel |
| 2008/0262991 | A1 | 10/2008 | Kapoor et al. |
| 2008/0279381 | A1 | 11/2008 | Narendra et al. |
| 2008/0309967 | A1 | 12/2008 | Ferlitsch et al. |
| 2009/0055536 | A1 | 2/2009 | Jo |
| 2009/0086252 | A1 | 4/2009 | Zucker et al. |
| 2009/0172786 | A1 | 7/2009 | Backa |
| 2009/0182931 | A1 | 7/2009 | Gill et al. |
| 2009/0232300 | A1 | 9/2009 | Zucker et al. |
| 2009/0327743 | A1 | 12/2009 | Finlayson et al. |
| 2010/0174784 | A1 | 7/2010 | Levey et al. |
| 2010/0250547 | A1 | 9/2010 | Grefenstette et al. |
| 2011/0167265 | A1 | 7/2011 | Ahuja et al. |
| 2011/0273554 | A1 | 11/2011 | Su et al. |
| 2012/0011189 | A1 | 1/2012 | Werner et al. |
| 2012/0183174 | A1 | 7/2012 | Basavapatna et al. |
| 2012/0191792 | A1 | 7/2012 | Chebiyyam |
| 2013/0246534 | A1 | 9/2013 | Chebiyyam |
| 2013/0276061 | A1 | 10/2013 | Chebiyyam et al. |
| 2014/0115086 | A1 | 4/2014 | Chebiyyam |
| 2014/0283145 | A1 | 9/2014 | Chebiyyam et al. |

FOREIGN PATENT DOCUMENTS

| | | |
|---|---|---|
| WO | 2003/076536 A1 | 9/2003 |
| WO | 2006/076536 A2 | 7/2006 |
| WO | 2006/076536 A3 | 11/2007 |

OTHER PUBLICATIONS

Office Action received for U.S. Appl. No. 12/102,526, dated Feb. 6, 2012, 16 pages.

Office Action received for U.S. Appl. No. 12/102,526, dated May 25, 2011, 18 pages.

Office Action received for U.S. Appl. No. 12/102,526, dated Nov. 24, 2010, 17 pages.

Notice of Allowance received for U.S. Appl. No. 12/102,625 dated Mar. 6, 2012, 16 pages.

U.S. Appl. No. 12/123,370, filed May 19, 2008.

Office Action received for U.S. Appl. No. 12/187,207, dated Mar. 25, 2011, 9 pages.

Notice of Allowance received for U.S. Appl. No. 12/187,207, dated Aug. 24, 2011, 5 pages.

Notice of Allowance received for U.S. Appl. No. 12/187,207, dated Sep. 11, 2012, 6 pages.

Supplemental Notice of Allowability received for U.S. Appl. No. 12/187,207, dated Oct. 16, 2012, 2 pages.

Office Action received for U.S. Appl. No. 13/429,363, dated Sep. 23, 2013, 13 pages.

Office Action received for U.S. Appl. No. 13/429,363, dated Mar. 21, 2014, 12 pages.

Office Action received for U.S. Appl. No. 13/429,363 dated Jul. 30, 2014, 12 pages.

Notice of Allowance received for U.S. Appl. No. 13/434,777, dated Dec. 17, 2013, 7 pages.

Office Action received for U.S. Appl. No. 13/434,777, dated Aug. 20, 2012, 12 pages.

Notice of Allowance received for U.S. Appl. No. 13/434,777, dated Jan. 27, 2014, 2 pages.

Office Action received for U.S. Appl. No. 13/434,777, dated Feb. 12, 2013, 7 pages.

Office Action received for U.S. Appl. No. 13/434,777, dated May 23, 2013, 7 pages.

Office Action received for U.S. Appl. No. 14/144,136 dated Jun. 2, 2014, 10 pages.

Fumera et al., "Spam Filtering Based on the Analysis of Text Information Embedded into Images" Journal of D Machine Learning Research, Dec. 2006, 22 pages.

Office Action received for U.S. Appl. No. 12/076,163 dated Apr. 28, 2011, 19 pages.

Office Action received for U.S. Appl. No. 12/076,163 dated Oct. 19, 2011, 23 pages.

Office Action received for U.S. Appl. No. 12/076,163 dated Sep. 4, 2012, 21 pages.

Office Action received for U.S. Appl. No. 12/076,163 dated Mar. 25, 2013, 20 pages.

Office Action received for U.S. Appl. No. 12/076,163 dated Sep. 10, 2013, 18 pages.

Notice of Allowance received for U.S. Appl. No. 12/076,163 dated Mar. 18, 2014, 19 pages.

Notice of Allowance received for U.S. Appl. No. 12/076,163 dated Jul. 18, 2014, 8 pages.

Chebiyyam et al., U.S. Appl. No. 11/210,321, "System, Method, and Computer Program Product for Characterizing Messages Based on Tone", filed Aug. 23, 2005, 26 pages.

Office Action received for U.S. Appl. No. 11/349,479, dated Mar. 22, 2010, 21 Pages.

Office Action received for U.S. Appl. No. 11/349,479, dated Dec. 8, 2008, 16 Pages.

Notice of Allowance received for U.S. Appl. No. 11/349,479, dated Oct. 7, 2010, 6 Pages.

Notice of Allowance received for U.S. Appl. No. 11/349,479, dated Nov. 8, 2010, 2 Pages.

Office Action received for U.S. Appl. No. 11/473,930, dated Jul. 16, 2010, 20 Pages.

Office Action received for U.S. Appl. No. 11/473,930, dated Aug. 8, 2012, 22 Pages.

Office Action received for U.S. Appl. No. 11/473,930, dated Sep. 14, 2011, 19 pages.

Office Action received for U.S. Appl. No. 11/473,930, dated Jan. 26, 2010, 14 pages.

Office Action received for U.S. Appl. No. 11/473,930 dated Mar. 1, 2012, 19 pages.

Office Action received for U.S. Appl. No. 11/473,930, dated Mar. 10, 2011, 19 pages.

(56) References Cited

OTHER PUBLICATIONS

Office Action received for U.S. Appl. No. 11/473,930, dated Aug. 17, 2009, 19 pages.
Office Action received for U.S. Appl. No. 11/473,930, dated Feb. 4, 2013, 23 pages.
Gopi K. Chebiyyam, U.S. Appl. No. 11/473,930, "System, Method and Computer Program Product for Reacting to a Change in an Aspect Associated With Software", filed Jun. 23, 2006, 25 pages.
Notice of Allowance received for U.S. Appl. No. 11/564,745, dated Jul. 29, 2013, 15 pages.
Office Action received for U.S. Appl. No. 11/564,745, dated Jun. 4, 2012, 23 pages.
Office Action received for U.S. Appl. No. 11/564,745, dated Apr. 5, 2013, 21 pages.
Office Action received for U.S. Appl. No. 11/740,844, dated Aug. 15, 2012, 17 Pages.
Office Action received for U.S. Appl. No. 11/740,844, dated Jan. 11, 2010, 16 pages.
Office Action received for U.S. Appl. No. 11/740,844, dated Feb. 18, 2011, 16 pages.
Office Action received for U.S. Appl. No. 11/740,844, dated Feb. 16, 2012, 15 pages.
Office Action received for U.S. Appl. No. 11/740,844, dated May 14, 2009, 11 pages.
Office Action received for U.S. Appl. No. 11/740,844, dated Jun. 24, 2010, 16 pages.
Office Action received for U.S. Appl. No. 11/740,844, dated Jul. 20, 2011, 19 pages.
Office Action received for U.S. Appl. No. 11/740,844, dated May 10, 2012, 15 pages.
Notice of Allowance received for U.S. Appl. No. 11/740,844, dated Sep. 5, 2013, 15 pages.
Office Action received for U.S. Appl. No. 11/740,844, dated May 3, 2013, 15 pages.
Office Action received for U.S. Appl. No. 11/840,831, dated Jul. 21, 2011, 10 pages.
Office Action received for U.S. Appl. No. 11/840,831, dated Oct. 12, 2010, 11 pages.
Notice of Allowance received for U.S. Appl. No. 11/840,831, dated Mar. 16, 2012, 10 pages.
Notice of Allowance received for U.S. Appl. No. 11/840,831, dated Apr. 3, 2012, 9 pages.
Notice of Allowance received for U.S. Appl. No. 11/840,831, dated May 9, 2012, 9 pages.
Office Action received for U.S. Appl. No. 11/840,831, dated May 5, 2011, 9 pages.
Office Action received for U.S. Appl. No. 11/840,831, dated Dec. 21, 2011, 10 pages.
Office Action received for U.S. Appl. No. 11/850,432, dated May 10, 2011, 14 pages.
Office Action received for U.S. Appl. No. 11/850,432, dated Jan. 31, 2014, 19 pages.
Office Action received for U.S. Appl. No. 11/850,432, dated Jul. 16, 2013, 17 pages.
Office Action received for U.S. Appl. No. 11/850,432, dated Oct. 7, 2010, 13 pages.
Office Action received for U.S. Appl. No. 11/905,420, dated Nov. 2, 2011, 21 pages.
Office Action received for U.S. Appl. No. 11/905,420, dated May 23, 2011, 15 pages.
Office Action received for U.S. Appl. No. 11/905,420, dated Jul. 23, 2012, 16 pages.
Notice of Allowance received for U.S. Appl. No. 11/905,420, dated Dec. 6, 2012, 12 pages.
Office Action received for U.S. Appl. No. 11/564,745, dated Jan. 19, 2012, 27 pages.
Office Action received for U.S. Appl. No. 11/564,745, dated Oct. 21, 2010, 29 pages.
Office Action received for U.S. Appl. No. 11/564,745, dated Apr. 21, 2010, 23 pages.
Office Action received for U.S. Appl. No. 11/564,745, dated Nov. 2, 2009, 19 pages.
Morejon, Mario, "Remote Desktop Support Out of the Box" May 21, 2007.
Faith M. Heikkila. "Encryption: Security Considerations for Portable Media Devices" IEEEComputer Society, IEEE Security & Privacy, Jul. and Aug. 2007, pp. 22-27.
Dabbish et al., "Understanding Email Use: Predicting Action on a Message", Apr. 2-7, 2005, pp. 691-700.
ClearContext, "Internet Archive Wayback Machine", Nov. 7, 2006, pp. 1-24. Also available at www.clearcontext.com/user_guide.
United States Patent and Trademark Office, "Notice of Allowance," issued in connection with U.S. Appl. No. 14/289,859, dated Oct. 17, 2018, 8 pages.
United States Patent and Trademark Office, "Notice of Allowance," issued in connection with U.S. Appl. No. 14/289,859, dated Jun. 14, 2018, 8 pages.
United States Patent and Trademark Office, "Non-Final Office Action," dated Mar. 13, 2015 in connection with U.S. Appl. No. 14/289,859, 9 pages.
United States Patent and Trademark Office, "Final Office Action," dated Sep. 10, 2015 in connection with U.S. Appl. No. 14/289,859, 13 pages.
United States Patent and Trademark Office, "Examiner's Answer," dated Oct. 6, 2016 in connection with U.S. Appl. No. 14/289,859, 17 pages.
United States Patent and Trademark Office, "Decsion on Appeal," dated Jul. 19, 2017 in connection with U.S. Appl. No. 14/289,859, 12 pages.
United States Patent and Trademark Office, "Decision on Request for Rehearing," dated Nov. 15, 2017 in connection with U.S. Appl. No. 14/289,859, 8 pages.
United States Patent and Trademark Office, "Office Communiration," dated Mar. 2, 2018 in connection with U.S. Appl. No. 14/289,859, 2 pages.

\* cited by examiner

SYSTEM, METHOD, AND COMPUTER PROGRAM PRODUCT FOR PREVENTING ACCESS TO DATA WITH RESPECT TO A DATA ACCESS ATTEMPT ASSOCIATED WITH A REMOTE DATA SHARING SESSION

RELATED APPLICATIONS

This patent arises from a continuation of U.S. Patent application Ser. No. 14/289,859, now U.S. Pat. No. 10,198,587, which was filed on May 29, 2014, and is a continuation of U.S. Patent Application No. 11/850,432, which was filed on Sep. 5, 2007. U.S. Patent application Ser. No. 14/289,859 and U.S. Patent application Ser. No. 11/850,432 are hereby incorporated herein by reference in their entirety. Priority to U.S. Patent application Ser. No. 14/289,859 and U.S. Patent application No. 11/850,432 is hereby claimed.

TECHNICAL FIELD

The present invention relates to data loss prevention, and more particularly to preventing data loss by preventing access data.

BACKGROUND ART

In the past, security systems have been developed for preventing data loss. For example, such data loss has generally included the unauthorized or otherwise unwanted disclosure of data (e.g. confidential data, etc.). However, security systems have exhibited various limitations in preventing data loss. For example, security systems have conventionally been deficient in preventing data loss due to remote data sharing.

There is thus a need for addressing these and/or other issues associated with the prior art.

SUMMARY

A system, method, and computer program product are provided for preventing access to data associated with a data access attempt. In use, a data access attempt associated with a remote data sharing session is identified. Further, access to the data is prevented.

DESCRIPTION OF EMBODIMENTS

Figure 1:
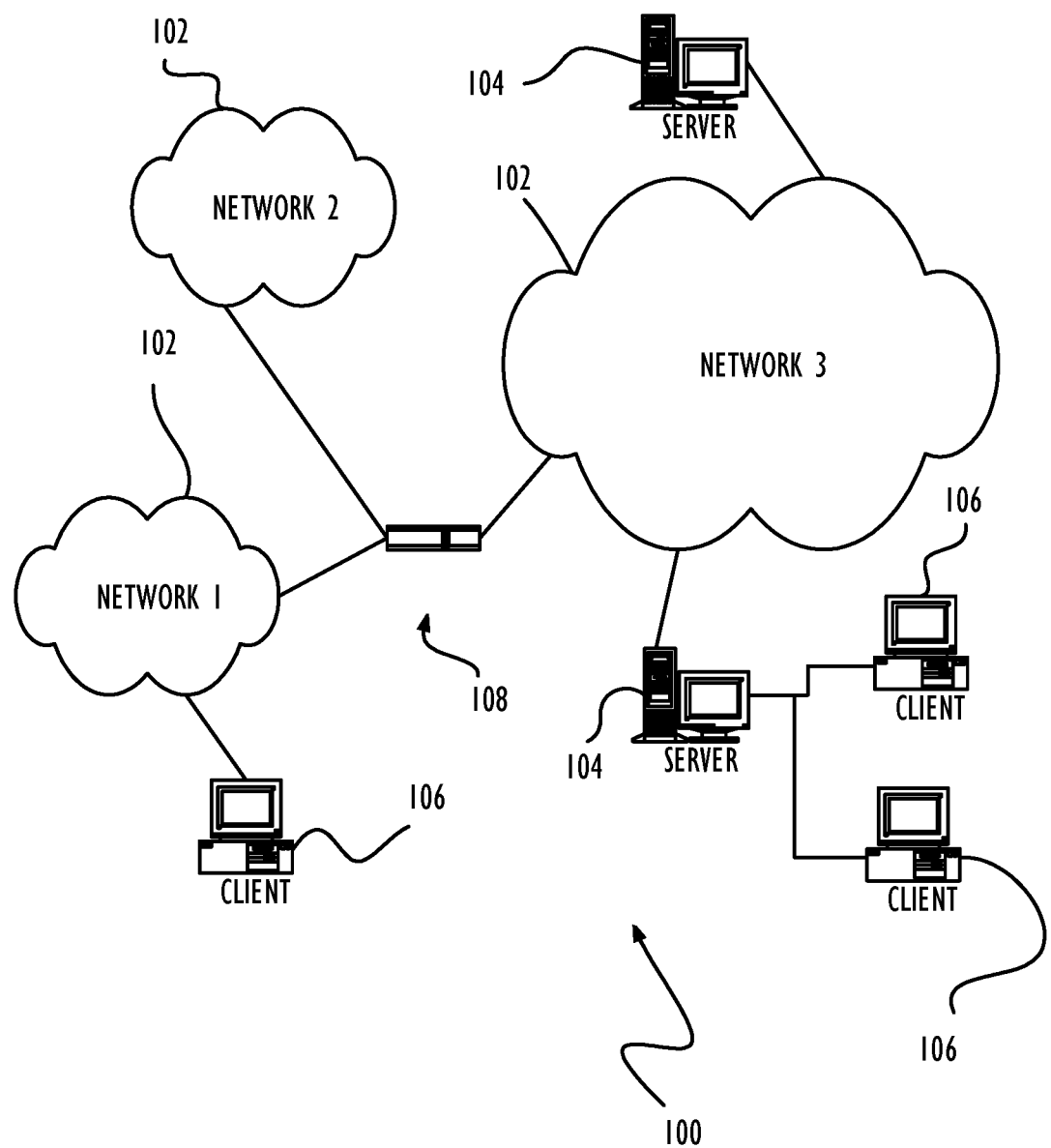
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
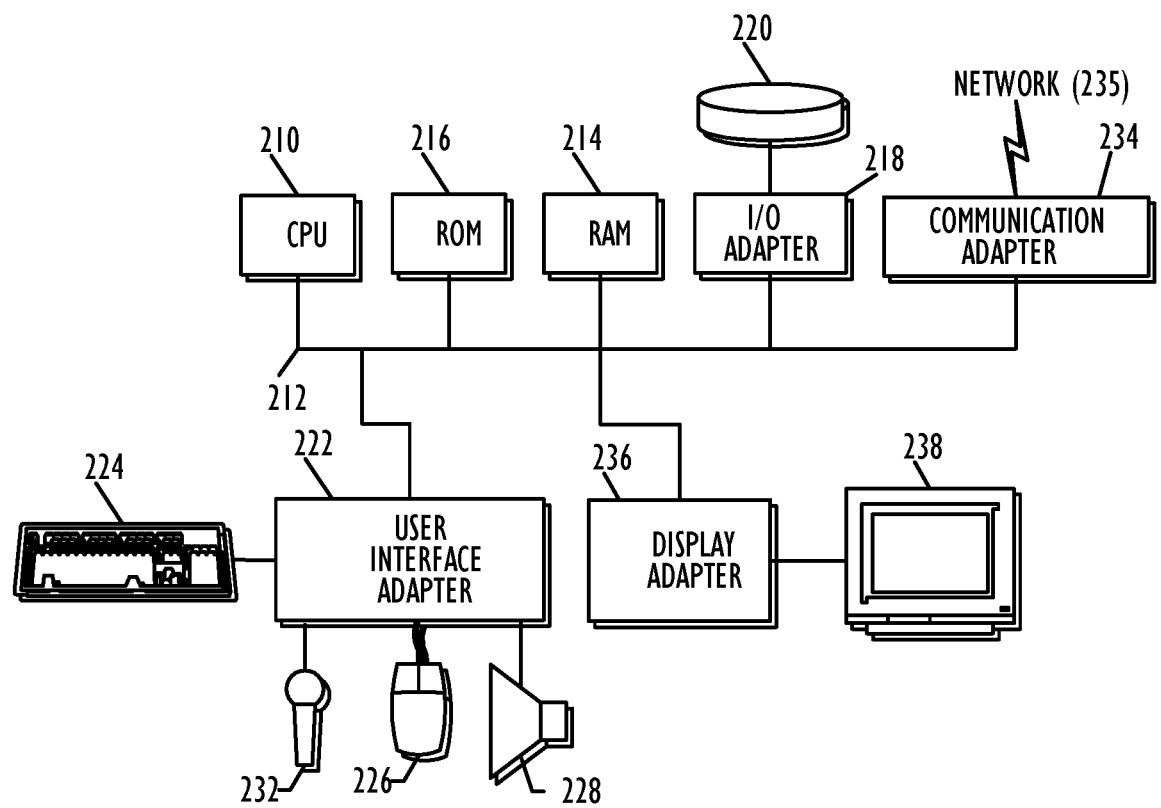
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
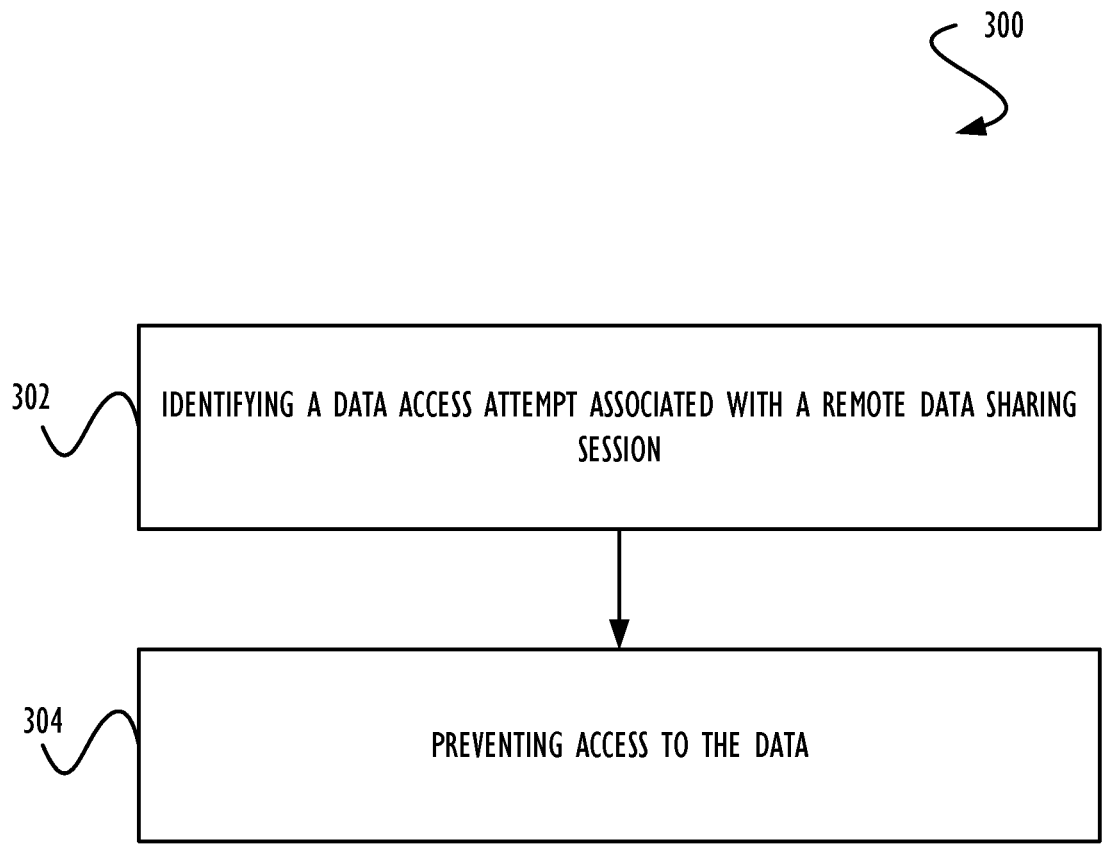
FIG. 3 shows a method for preventing access to data associated with a data access attempt, in accordance with one embodiment.

FIG. 3 shows a method 300 for preventing access to data associated with a data access attempt, in accordance with one embodiment. As an option, the method 300 may be carried out in the context of the architecture and environment of FIGS. 1 and/or 2. Of course, however, the method 300 may be carried out in any desired environment.

As shown in operation 302, a data access attempt associated with a remote data sharing session is identified. In the context of the present description, the data may include information, code, and/or anything else capable of being associated with a remote data session. In various embodiments, the data may include any number of documents, electronic mail (email) messages, programs, uniform resource locators (URLs), etc. Additionally, the data may be stored on a client, a server, and/or any other device (e.g. such as any of the devices described above with respect to FIGS. 1 and/or 2, etc.).

To this end, the data access attempt may include any attempt associated with a remote data sharing session to access data. For example, the data access attempt may include a request to access the data. In other examples, the data access attempt may include an attempt to open the data, read the data, write to the data, copy the data, attach the data to other data (e.g. an email), display the data utilizing a liquid crystal display (LCD) projector, etc.

In the context of the present description, the remote data sharing session may include any session in which the data may be shared remotely, where the term remotely indicates the involvement of any device separate from the device on which the data is stored, etc. For example, the remote data sharing session may, in one embodiment, include a time period in which remote data sharing is enabled. As an option, the data may be shared remotely by viewing the data remotely, interacting with the data remotely, etc. In one embodiment, such remote data sharing may include any displaying, presenting, etc. of data located at a first location to a remote second location. Just by way of example, the remote data sharing may include sharing a desktop display with a remote computer, sharing the data with a projector (e.g. LCD projector, etc.) which projects the data, etc.

Moreover, the remote data sharing session may be associated with (e.g. facilitated by, etc.) a remote data sharing application. For example, the remote data sharing application may include a remote desktop application (e.g. Microsoft® Office Live Meeting, Citrix® GoToAssist®, etc.). Thus, the remote data sharing application may optionally be capable of sharing data remotely from a first device with a second device. As an option, the data access attempt may be associated with the remote data sharing session by being initiated via the remote data sharing session (e.g. via a command executed during the remote data sharing session). As another option, the data access attempt may include an attempt to access the remote data sharing session, the remote data sharing application associated with such session and/or any other aspect associated with the remote data sharing session.

To this end, the data access attempt may be initiated manually (e.g. by a user), in one embodiment. In another embodiment, the data access attempt may be initiated automatically (e.g. via an application, etc.). As described above, the data access attempt may also be initiated via the remote data sharing session.

Further, the data access attempt may be identified in any desired manner. In one embodiment, the data access attempt may be identified utilizing a client (e.g. on which the data is stored, etc.). In this way, the client may identify data access attempts initiated at the client. For example, the data access attempt may be identified utilizing an agent installed on the client, which monitors data access attempts.

As another example, the data access attempt may be identified utilizing a plug-in, add-in, etc. to an application (e.g. web browser, word processing application, data sharing application, etc.) associated with, installed on, etc. the client. As an option, such application may be the source of the data access attempt, an application utilized in accessing the data, an application utilized for sharing the data remotely, etc. Thus, each of a plurality of applications associated with the client may be associated with a separate plug-in, etc. As another option, the plug-in, etc. may be continuously active when the application is running (e.g. being executed).

In another embodiment, the data access attempt may be identified utilizing a gateway. For example, the gateway may identify the data access attempt based on network traffic received over a network (e.g. such as any of the networks described above with respect to FIG. 1). As an option, such gateway may similarly utilize an agent, plug-in, etc. for identifying the data access attempt.

As also shown, access to the data is prevented. Note operation 304. In the context of the present description, the access of operation 304 may include any access associated with (e.g. requested in conjunction with, etc.) the data access attempt. In various embodiments, the access may be prevented by blocking the access, disallowing the access, denying a request associated with the data access attempt, disallowing network traffic associated with the data access attempt, etc. Of course, however, the access to the data may be prevented in any desired manner.

In one embodiment, the access may be prevented, if it is determined that the data matches predetermined data. Such predetermined data may include known confidential data (e.g. data predetermined to be confidential, etc.). In another embodiment, the access may be prevented, if it is determined that a fingerprint (e.g. hash, etc.) of the data matches a predetermined fingerprint, such as a fingerprint of known confidential data, for example.

In yet another embodiment, the access may be prevented, if it is determined that a remote data sharing application associated with the remote data sharing session is predetermined to be disallowed from accessing the data. For example, a user may configure (e.g. predefine, etc.) remote data sharing applications allowed to and/or disallowed from accessing data. As an option, such remote data sharing applications may be predetermined with respect to each of a plurality of instances of different data, with respect to locations of data capable of being accessed, with respect to categories of data capable of being accessed (e.g. file types, etc.), and/or with respect to any data capable of being accessed.

In still yet another embodiment, the access may be prevented based on a determination of whether the remote data sharing session is enabled. For example, if the remote data sharing session is enabled, access to the data may be prevented. Of course, however, preventing access to the data may be based on any desired criteria.

To this end, such access to data may be prevented in any desired manner. In one embodiment, such access prevention may eliminate unwanted loss, disclosure, etc. of the data via the remote data sharing session. For example, preventing access to the data may prevent the data from being presented, displayed, etc. to a remote device utilizing remote data sharing techniques associated with the remote data sharing session. Accordingly, in addition to optionally educating users on potential data leakage via remote data sharing sessions, such data leakage may also be limited by preventing access to data when a data access attempt is associated with a remote data sharing session.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
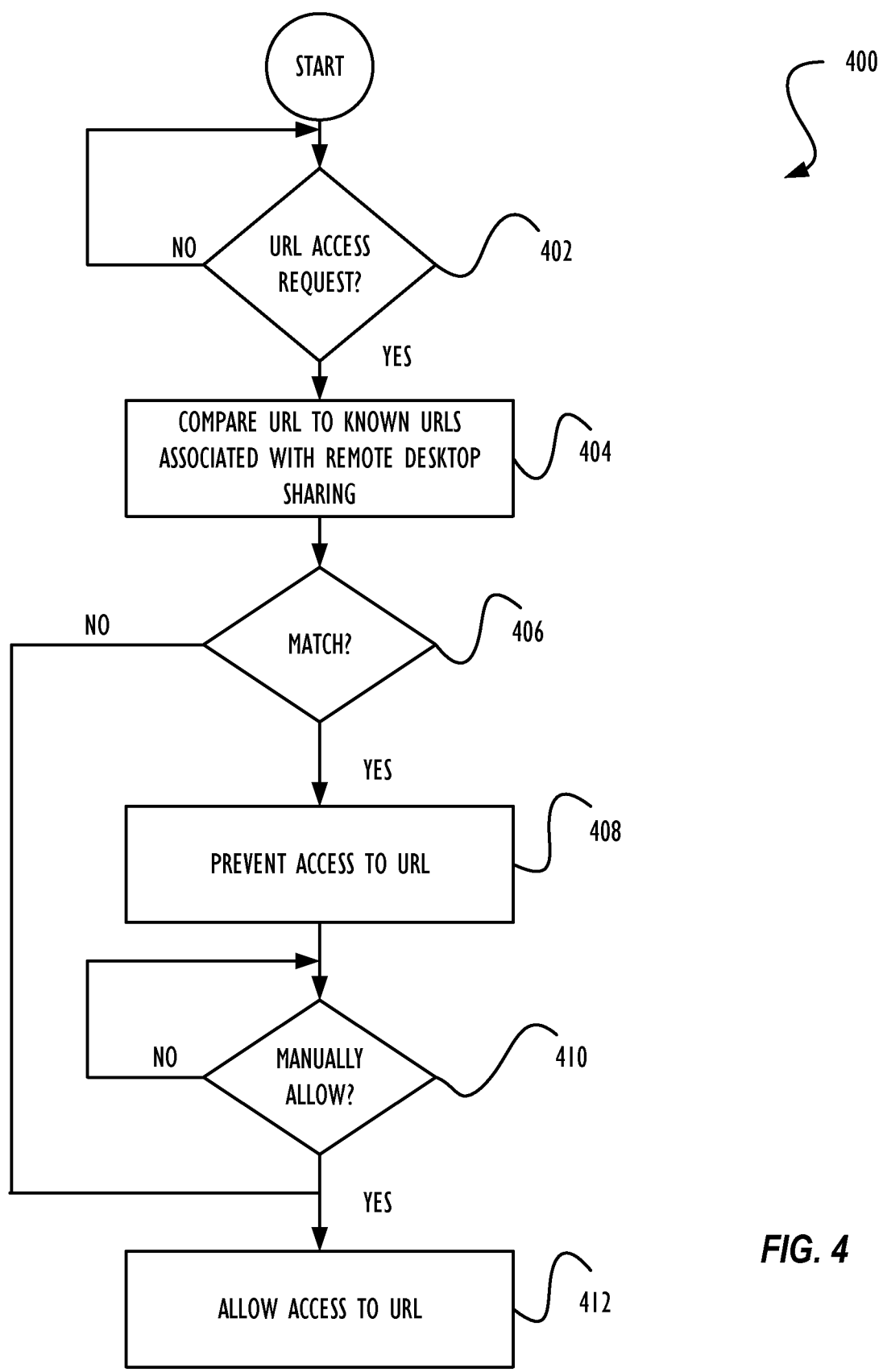
FIG. 4 shows a method for preventing access to a uniform resource locator (URL) associated with remote desktop sharing, in accordance with another embodiment.

FIG. 4 shows method 400 for preventing access to a uniform resource locator (URL) associated with remote desktop sharing, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, it is determined whether a URL access request has been issued. In the context of the present embodiment, the URL access request may include a request to access content (e.g. web content, etc.) associated with a URL. In one embodiment, the URL access request may be issued via a web browser. For example, the URL access request may be issued based on a user selection of a web link on a web page displayed via the web browser, a user entry of the URL into the web browser, etc.

Further, the URL access request may be identified utilizing an agent installed on a client via which the URL access request is issued. In another embodiment, the URL access request may be identified utilizing a plug-in, add-in, etc. associated with the web browser via which the URL access request is issued. In yet another embodiment, the URL access request may be identified utilizing a plug-in, add-in, etc. associated with an application enabled for remotely sharing data. In still yet another embodiment, the URL access request may be identified utilizing an agent, plug-in, etc. installed on a gateway (e.g. via which the URL access request is communicated over a network, etc.).

In response to a determination that the URL access request has been issued, the URL is compared to known URLs associated with remote desktop sharing. Note operation 404. Such known URLs may include any URLs predetermined to be associated with remote desktop sharing. For example, the known URLs may include a location on a network of a remote desktop sharing application capable of being utilized for remotely sharing a desktop. Optionally, such known URLs may be predetermined based on a user configuration, based on an automatic configuration (e.g. web crawler, etc.).

In one embodiment, the known URLs may be stored in a library of known URLs. In another embodiment, the known URLs may be stored on the client via which the URL access request is initiated. In yet another embodiment, the known URLs may be stored at a central location (e.g. central server, etc.) capable of being accessed by the client and/or gateway. Optionally, the URL may be compared to the known URLs by comparing any portion or an entirety of the URL with any respective portion or entirety of the known URLs.

It is further determined whether the URL matches any of the known URLs, as shown in decision 406. To this end, such determination may be based on the comparison of the URL with the known URLs. If it is determined that the URL does not match any of the known URLs, access to the URL is allowed. Note operation 412. Such access may include the access requested by the URL access request. In one embodiment, content associated with the URL, such as a web page, may be allowed to be presented. In another embodiment, the URL access request may be allowed to be sent to a destination (e.g. web server, etc.) associated with the request.

If, however, it is determined that the URL matches one of the known URLs, access to the URL is prevented. Note operation 408. In one embodiment, content associated with the URL may be prevented from being presented. In another embodiment, the URL access request, such as network traffic associated with such URL access request, may be prevented from being communicated to the destination associated with the request. As an option, access to the URL may be prevented utilizing the agent, plug-in, etc. used for identifying the URL access request (as described above in operation 402).

Moreover, it is determined whether access to the URL is manually allowed, as shown in operation 410. In one embodiment, manually allowing access to the URL may include a user selecting (e.g. via a user interface) to allow the access. The user may include any user authorized to manually allow such access. For example, in response to preventing access to the URL (operation 408), a notification may be communicated to the user. Additionally, such notification may include an option capable of being selected by the user for manually allowing access to the URL.

In another embodiment, access to the URL may be manually allowed based on a predefined list of URLs to which access is allowed. For example, a user may configure a list of URLs associated with remote desktop sharing to which access is allowed. Thus, if the URL matches a URL in the predefined list of URLs to which access is allowed, access to the URL may be manually allowed.

In response to a determination that access to the URL is manually allowed, access to the URL is allowed, as shown in operation 412. To this end, access to a URL may be allowed automatically if the URL does not match known URLs associated with remote desktop sharing or manually as desired by a user. Still yet, it may be continuously determined whether access to the URL is manually allowed (e.g. for a predefined time period, etc.). In this way, access to the URL may optionally be allowed at any time after access to the URL is prevented.

Figure 5:
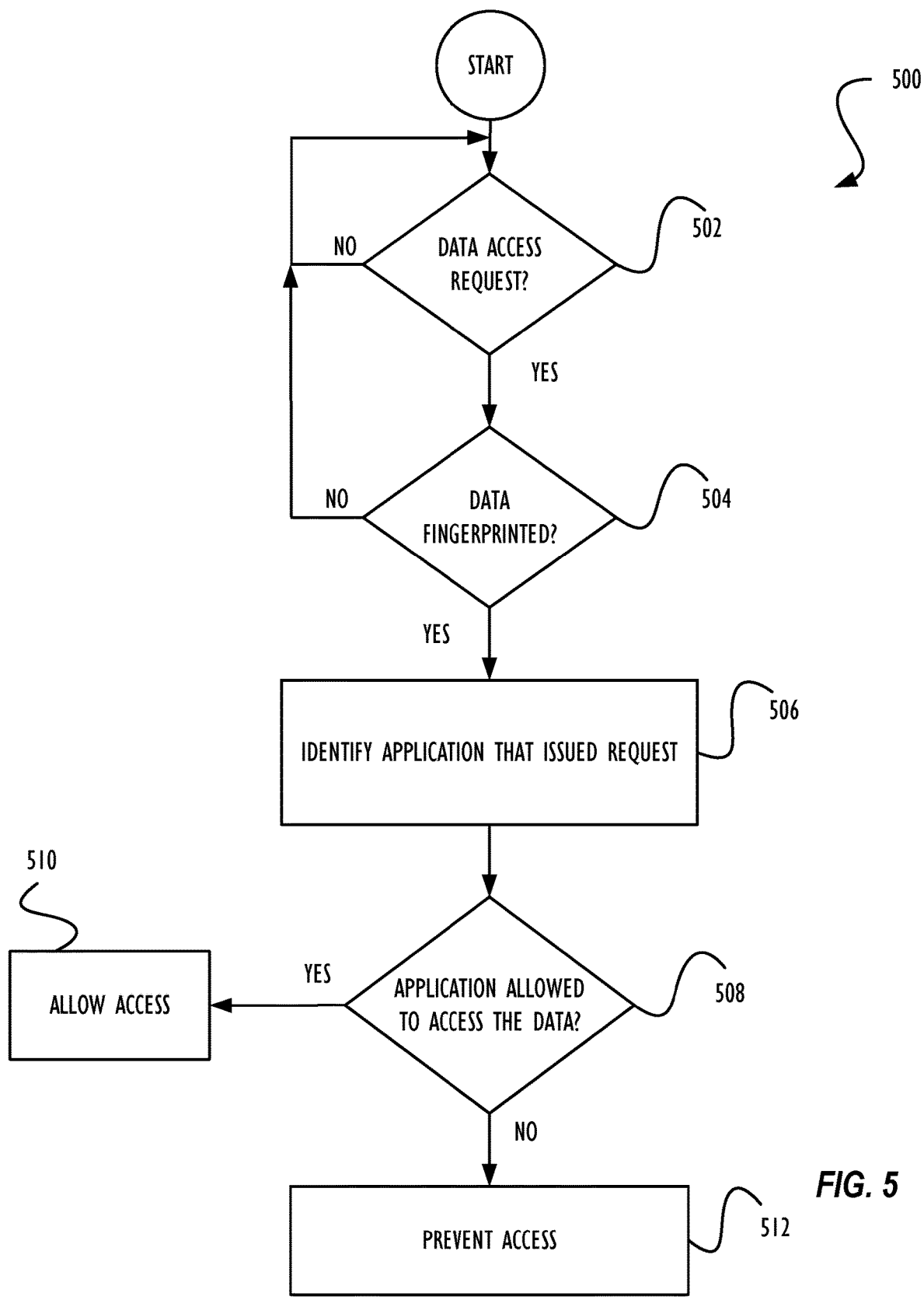
FIG. 5 shows a method for preventing access to data based on an application that initiated a data access request, in accordance with yet another embodiment.

FIG. 5 shows a method 500 for preventing access to data based on an application that initiated a data access request, in accordance with yet another embodiment. As an option, the method 500 may be carried out in the context of the architecture and environment of FIGS. 1-4. Of course, however, the method 500 may be carried out in any desired environment. Again, it should also be noted that the aforementioned definitions may apply during the present description.

In decision 502, it is determined whether a data access request has been issued. In one embodiment, the data access request may include a request to access a document. Just by way of example, the data access request may include a request to open the document. As another example, the data access request may include a request to attach the data to an email, a document, etc.

In another embodiment, the data access request may be issued via an application program interface (API). In yet another embodiment, the data access request may be issued manually by a user, for example, by selecting to open the data. In still yet another embodiment, the data access request may be issued automatically (e.g. via an application requesting to access the data, etc.).

Further, the data access request may be identified utilizing an agent installed on a client via which the data access request is issued. In another embodiment, the data access request may be identified utilizing an agent installed on a gateway (e.g. via which the data access request is communicated over a network, etc.). Of course, however, the data access request may be identified in any manner.

In response to a determination that the data access request has been issued, it is determined whether the data is fingerprinted. Note decision 504. For example, a plurality of predetermined fingerprints may be stored in a database. Further, the database may store additional information with respect to the predetermined fingerprints. For example, the database may store identifiers of applications allowed to be utilized for accessing data associated with each of the predetermined fingerprints, disallowed for use in accessing such data, etc. As an option, the predetermined fingerprints and associated allowed/disallowed applications may be configured by a user.

Table 1 illustrates one example of a database capable of being utilized for storing predetermined fingerprints of data and identifiers of associated applications allowed to be utilized for accessing such data. In this way, the database may be utilized for associating each fingerprint with an application. It should be noted that the database is set forth for illustrative purposes only, and thus should not be construed as limiting in any manner.

TABLE 1

| DATA FINGERPRINT | ALLOWED APPLICATION IDENTIFIER |
|---|---|
| FINGERPRINT_01 | APPLICATION_01, APPLICATION_02 |
| FINGERPRINT_02 | APPLICATION_02 |
| FINGERPRINT_03 | APPLICATION_01 |

In the context of the present embodiment, such predetermined fingerprints may include fingerprints of various data that have been predefined. As an option, the predetermined fingerprints may indicate data which is at least potentially confidential (e.g. for which unauthorized disclosure is unwanted, etc.). Thus, a fingerprint of the data may be compared with the predetermined fingerprints in the database, such that a match may indicate that the data is fingerprinted.

In response to a determination that the data is fingerprinted, an application that initiated the data access request is identified, as shown in operation 506. Optionally, the application may include an application to be utilized for accessing the data. For example, the application may include an application capable of being utilized for displaying the data. As another option, identifying the application may include identifying a version of the application, identifying a name of the application, identifying a provider of the application, etc.

In one embodiment, the application may be identified based on the data access request. For example, the data access request may include an identifier of the application that issued the request (e.g. a source of the request, etc.). Of course, however, the application may be identified in any manner.

It is further determined whether the identified application is allowed to access the data, as shown in decision 508. In one embodiment, the predetermined fingerprint matching the fingerprint of the data may be identified in the database. Furthermore, application identifiers stored in the database in association with such identified predetermined fingerprint may be identified. Accordingly, the application that issued the data access request may be compared with the identified application identifiers, such that it may be determined whether any such identified application identifiers match the application that issued the data access request.

As an option, the application identifiers in the database associated with a fingerprint may indicate applications predetermined to be allowed to access data associated with the fingerprint. To this end, a match may indicate that the data is allowed to be accessed utilizing the identified application that issued the data access request. As another option, the application identifiers in the database associated with a fingerprint may indicate applications predetermined to be disallowed from accessing data associated with the fingerprint. Thus, a match may indicate that the data is not allowed to be accessed utilizing the identified application that issued the data access request.

In another embodiment, predetermined applications may be determined to be dedicated applications allowed to access any data. For example, such dedicated applications may be predetermined based on a user configuration. As an option, the dedicated applications may include the only applications allowed to access fingerprinted data.

In yet another embodiment, predetermined applications may be disallowed from being utilized during a remote data sharing session. For example, if it is determined that one of the predetermined applications is running, a remote data sharing session may be prevented from being enabled. As another example, if it is determined that a remote data sharing session is enabled, one of the predetermined applications may be prevented from being initiated.

If it is determined that the application that issued the data access request is allowed to access the data, access to the data is allowed. Note operation 510. Such access may include the access requested by the data access request. In one embodiment, the data may be allowed to be presented, displayed, attached, etc. In another embodiment, the data access request may be allowed to be sent to a destination (e.g. server, etc.) associated with the request.

If, however, it is determined that the application that issued the data access request is not allowed to access the data, access to the data may be prevented. Note operation 512. In one embodiment, the data may be prevented from being presented. In another embodiment, the data access request, such as network traffic associated with such data access request, may be prevented from being communicated to the destination associated with the request. As an option, access to the data may be prevented utilizing the agent used for identifying the data access request (as described above in operation 502). Just by way of example, in one embodiment, the data access request may include a request to display the data utilizing a projector, such that data loss may be prevented with respect to a public sharing session associated with an LCD projector, etc.

In this way, for each of a plurality of different fingerprints of various data, applications may be indicated as being allowed to access the data and/or disallowed from accessing the data. Thus, particular data may only be accessible via predefined applications, as desired. In one embodiment, such predefined applications may allow a single agent installed on a client, gateway, etc. to determine whether any of a plurality of different applications may be utilized for accessing data associated with a data access request.

Figure 6:
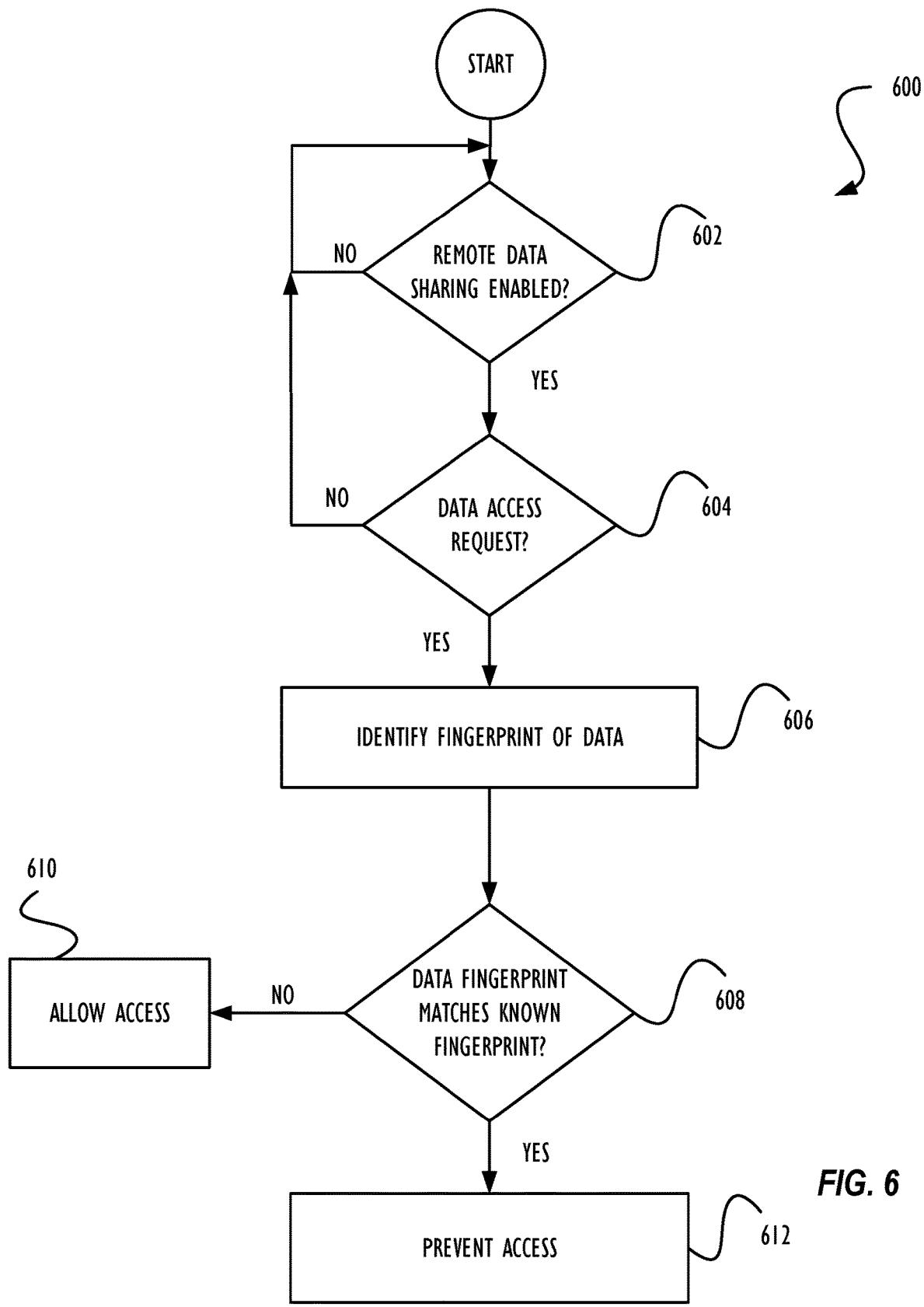
FIG. 6 shows a method for preventing access to data based on a fingerprint of the data, in accordance with still yet another embodiment.

FIG. 6 shows a method 600 for preventing access to data based on a fingerprint of the data, in accordance with still yet another embodiment. As an option, the method 600 may be carried out in the context of the architecture and environment of FIGS. 1-4. Of course, however, the method 600 may be carried out in any desired environment. Again, it should also be noted that the aforementioned definitions may apply during the present description.

As shown in decision 602, it is determined whether remote data sharing is enabled. In one embodiment, it may be determined whether the remote data sharing is enabled based on a determination of whether a remote data sharing application, or any associated processes, are executing. For example, an agent installed on a client may determine whether a remote data sharing application is executing on the client.

In response to a determination that the remote data sharing is enabled, it is determined whether a data access request has been issued, as shown in decision 604. In one embodiment, the data access request may be identified utilizing an agent installed on the client via which the data access request is issued. In another embodiment, the data access request may be identified utilizing a plug-in, add-in, etc. associated with an application via which the data access request is issued. In yet another embodiment, the data access request may be identified utilizing a plug-in, add-in, etc. associated with a remote data sharing application.

If a data access request has been issued, a fingerprint of the data is identified, as shown in operation 606. The fingerprint of the data may be identified by hashing the data, in one embodiment. In another embodiment, the fingerprint of the data may be identified by calculating a value of the data utilizing a predetermined algorithm.

Furthermore, as shown in decision 608, it is determined whether the identified fingerprint matches a known fingerprint. In the context of the present embodiment, the known fingerprint may include any predetermined fingerprint of data. For example, a database may store a plurality of predetermined fingerprints of data. Optionally, such database may be stored locally (e.g. on a client on which the data access request was issued), but of course may also be stored remotely (e.g. at a location central to a plurality of clients on a network). Moreover, the predetermined fingerprints may be of known confidential data.

To this end, determining whether the identified fingerprint matches a known fingerprint may include comparing the identified fingerprint to a plurality of known fingerprints. If it is determined that the fingerprint of the data does not match a known fingerprint (e.g. based on the comparison, etc.), access to the data may be allowed. Note operation 610. For example, the access may include the access requested by the issued data access request (in operation 604). If, however, it is determined that the fingerprint of the data matches a known fingerprint (e.g. based on the comparison, etc.), access to the data may be prevented. Note operation 612.

To this end, data may be prevented from being accessed based on a fingerprint of the data when a remote data sharing session is enabled. In another optional embodiment, if it is determined that the data is already opened prior to enablement of a remote data sharing session, such data may be closed in response to a request to initiate the remote data sharing session. Thus, data loss may be prevented based on various access requests, including, for example, a public sharing session where the data is displayed on an LCD projector, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An article of manufacture comprising instructions that, when executed, cause a machine to at least:
   detect a request to access data;
   hash the data to determine a first fingerprint of the data;
   compare the first fingerprint of the data to a second fingerprint from a plurality of fingerprints stored in a database in association with ones of a plurality of applications, the database to indicate that at least a first application of the plurality of the applications is authorized to access the data when the first fingerprint of the data matches the second fingerprint, the second fingerprint stored in association with the at least the first application; and
   determine whether to allow the request based on a comparison of: (a) a second application identifier of a second application that initiated the request and (b) a first application identifier of the at least the first application associated with the second fingerprint.

2. The article of manufacture of claim 1, wherein the request includes the second identifier of the second application that initiated the request.

3. The article of manufacture of claim 1, wherein the instructions are to cause the machine to determine whether the first fingerprint of the data matches the second fingerprint by:
   comparing the first fingerprint of the data with the plurality of the fingerprints.

4. The article of manufacture of claim 1, wherein the database stores ones of the plurality of the fingerprints matching the first fingerprint in association with the first application and some of the ones of the plurality of the applications to indicate that the first application and the some of the ones of the plurality of the applications are allowed to access the data.

5. The article of manufacture of claim 1, wherein the database stores ones of the plurality of the fingerprints in association with the first application and some of the ones of the plurality of the applications to indicate that the first application and the some of the ones of the plurality of the applications are not allowed to access the data.

6. The article of manufacture of claim 1, wherein the database includes an identification of a dedicated application that is allowed to access any data.

7. The article of manufacture of claim 1, wherein the instructions are to cause the machine to determine whether to allow the request by:
   determining whether a remote desktop sharing session is in operation; and
   preventing initiation of the second application responsive to the determination.

8. An article of manufacture comprising instructions that, when executed, cause a machine to at least:
   determine whether remote data sharing is enabled;
   determine a first fingerprint of data to which access is requested, the determining of the first fingerprint of the data responsive to a determination that the remote data sharing is enabled, and the first fingerprint of the data determined by hashing the data; and
   determine whether to allow access to the data responsive to: (a) a first match of the first fingerprint with a second fingerprint and (b) a second match of a first application identifier with a second application identifier, the first application identifier corresponding to a first application that initiated the request, and the second application identifier stored in association with the second fingerprint.

9. The article of manufacture of claim 8, wherein the instructions are to cause the machine to determine whether the remote data sharing is currently enabled by determining whether a remote data sharing application is executing.

10. The article of manufacture of claim 8, wherein the instructions are to cause the machine to identify the first fingerprint of the data to which the access is requested by calculating a value of the data utilizing a predetermined algorithm.

11. The article of manufacture of claim 8, wherein the instructions are to cause the machine to determine whether to allow access to the data by accessing the second fingerprint of the data in a database of fingerprints of data.

12. The article of manufacture of claim 11, wherein the database is stored remotely to the machine.

13. The article of manufacture of claim 8, wherein the instructions are further to cause the machine to close the data already opened prior to enablement of a remote desktop sharing session.

14. A method for preventing data loss by determining whether to allow a request to access data, comprising:
- detecting, by a computer system, a request to access data;
- hashing the data to determine a first fingerprint of the data;
- comparing, by the computer system, the first fingerprint of the data to a second fingerprint from a plurality of fingerprints stored in a database in association with ones of a plurality of applications, the database to indicate that at least a first application of the plurality of the applications is authorized to access the data when the first fingerprint of the data matches the second fingerprint, the second fingerprint stored in association with the at least the first application; and
- determining, by the computer system, whether to allow the request based on a comparison of: (a) a second application identifier of a second application that initiated the request and (b) a first application identifier of the at least the first application associated with the second fingerprint.

15. The method of claim 14, wherein the determining, by the computer system, of whether the first fingerprint of the data matches the second fingerprint includes:
- comparing the first fingerprint of the data with the plurality of the fingerprints.

16. The method of claim 14, wherein the determining, by the computer system, of whether to allow the request includes:
- determining whether the request to access to the data is by a dedicated application allowed to access any data.

17. A method for preventing data loss by determining whether to allow access to data, comprising:
- determining, by a computer system, whether remote data sharing is enabled;
- determining, by the computer system, a first fingerprint of data to which access is requested, the determining of the first fingerprint of the data responsive to a determination that the remote data sharing is enabled, and the first fingerprint of the data determined by hashing the data; and
- determining, by the computer system, whether to allow access to the data responsive to: (a) a first match of the first fingerprint with a second fingerprint and (b) a second match of a first application identifier with a second application identifier, the first application identifier corresponding to a first application that initiated the request, and the second application identifier stored in association with the second fingerprint.

18. The method of claim 17, wherein the determining, by the computer system, of whether to allow the access to the data includes looking up the first fingerprint of the data in a database of fingerprints of data stored remotely to the computer system.

19. The method of claim 17, further including:
- determining, by the computer system, that the data was opened prior to enablement of the remote data sharing session; and
- closing, by the computer system, the data in response to a request to initiate the remote data sharing session.

\* \* \* \* \*